July 1, 1947. S. D. LAVOIE Re. 22,894

WAVE METER

Original Filed Sept. 24, 1941 3 Sheets-Sheet 1

INVENTOR
STEPHEN D. LAVOIE
BY Lester W. Geil
HIS AGENT

July 1, 1947. S. D. LAVOIE Re. 22,894

WAVE METER

Original Filed Sept. 24, 1941 3 Sheets-Sheet 2

INVENTOR
STEPHEN D. LAVOIE
BY Lester C. Bailey
HIS AGENT

July 1, 1947. S. D. LAVOIE Re. 22,894

WAVE METER

Original Filed Sept. 24, 1941 3 Sheets-Sheet 3

INVENTOR
STEPHEN D LAVOIE
BY Lester K. Bailey
HIS AGENT

Reissued July 1, 1947

Re. 22,894

UNITED STATES PATENT OFFICE 22,894

WAVEMETER

Stephen D. Lavoie, Little Silver, N. J., assignor to Manufacturers Electronic Developments, Inc., Morganville, N. J., a corporation of New Jersey Original No. 2,349,440 dated May 23, 1944, Serial No. 412,102, September 24, 1941. Application for reissue October 24, 1944, Serial No. 560,087

10 Claims. (Cl. 250—39)

The present invention relates to wave meters, and more particularly to instruments for measuring the wave length or frequency of ultra-high frequency oscillations generated, for example, by an electronic tube oscillator. It represents a modification of the structure illustrated and described in my application for patent filed August 5, 1941, which matured into Patent No. 2,328,561 and my application for patent filed August 25, 1942, which matured into Patent No. 2,355,088.

There are, in general, two ways of measuring frequencies or wave lengths if the use of multivibrators and other auxiliary apparatus is disregarded. These two methods may be classified as (*a*) Transmission line type,
(*b*) Coil and condenser type.

The usual method of measuring the frequency of an oscillator with the transmission line type of wave meter is to couple the line to the oscillator and observe the change in the meter connected in the circuit of the oscillator as the line is shorted through maximum and minimum nodal points. A shorting bar is moved up and down the transmission line, shorting out successively adjacent points on the line. The impedance of the line is reflected back on the oscillator, and as the bar is moved back and forth through the maximum or minimum points the impedance of the oscillator outfit is changed. The meter is ordinarily placed in the grid circuit of the oscillator to indicate grid current which will vary in accordance with the changes in the impedance of the transmission line. This method will measure ultra-high frequencies, but not very accurately, for the reason that the transmission line represents distributed inductance and capacity so that the line responds not only to the basic frequency but also to multiples and submultiples thereof. The apparatus does not lend itself to rapid measurement and is large and cumbersome, requiring great care in making the determinations.

The coil and condenser type of wave meter, when designed and employed in the ordinary manner, is limited as to the range of frequency measurement, and in general will give accurate results only up to a few hundred megacycles, because a meter of this type employs an open form of inductance and a condenser of the usual construction. It is apparent that in a construction of this kind considerable leakage of current through the condenser and coil is inevitable, so that a meter of this type is completely unreliable in the ultra-high frequency wave band, for example, between 300 and 700 megacycles.

The improved wave meter, which will be described presently, is of the coil-condenser type referred to above, but the structure has been so completely modified as to increase the frequency range at which highly accurate results are obtained. In the first place, the coil structure, as modified, has little or no resemblance to an ordinary wound coil, although providing the necessary inductive reactance. It has been found that coils of the ordinary type cannot be satisfactorily built at the present time which have a so-called ratio $$Q=\left(\frac{2\pi fL}{R}\right)$$

sufficiently high to provide the requisite sharpness of the frequency resonance curve. Secondly, the necessary inductance is provided without any appreciable distributed capacity, and substantially all of the capacity which controls the resonance frequency of the tuned circuit is lumped into a single element.

The primary object of the present invention is to provide an accurate, compact and continuously variable wave meter for the ultra-high frequency spectrum.

Another object is to provide an ultra-high frequency wave meter which maintains its accuracy of measurement without further calibration over long periods of time and preferably over the entire operating life of the meter.

A further object is to provide an instrument of the type referred to, which is inexpensive, self-contained, portable, is shielded, and which has the minimum number of operating parts.

Another object is to provide an ultra-high frequency wave meter in which the frequencies to which the meter accurately responds may be readily adjusted over a relatively wide frequency range, and the measurement of frequency can be indicated directly in cycles per second or in wave length.

A still further object is to provide a wave meter which can accurately measure frequencies in a range above 300 megacycles, and the resonant circuits of the meter will not respond to the effects of multiple and sub-multiple frequencies.

In still another aspect the invention comprises an ultra-high frequency meter in which the ratio of reactance to resistance Q is exceedingly high in order to assure a sufficient sharpness of the frequency resonance curve from which the frequency indications are derived.

These objects are attained, in brief, by providing a meter which operates on the coil-condenser principle, employing maximum current indications (as distinguished from null current), and in which the variations in frequency response are obtained by changing the effects of a lumped capacity. The inductance of the resonant circuit is provided without the use of an ordinary type of wound coil so that leakage between turns and also distributed capacity are avoided. The variable lumped capacitance of the improved meter resides between the rugged casing of the meter and the plunger which is given a reciprocatory movement of a positive and resettable character.

Other objects and features will be apparent from a reading of the following specification together with the accompanying drawings.

Figure 3:
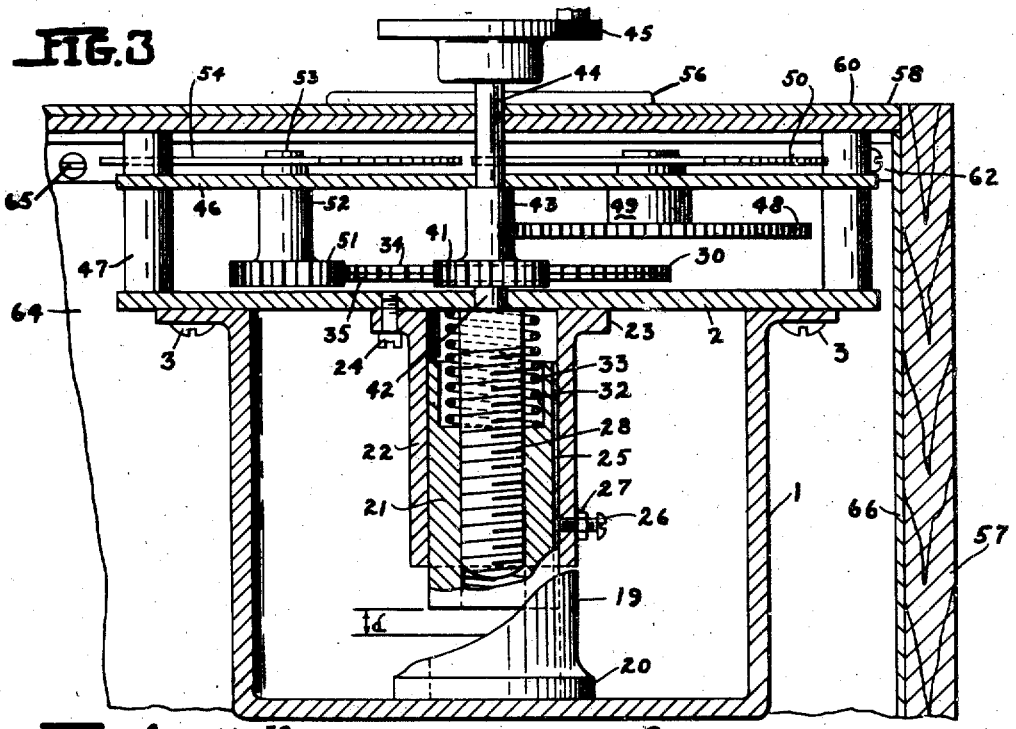
Figure 3 is a sectional view of the improved meter partly broken away. The section is taken along the line 3—3 in Figure 4.

Referring to the drawings, the ultra-high frequency wave meter embodying my invention comprises a heavy approximately rectangular metal housing 1 (Figures 3, 4 and 5), preferably a one-piece aluminum casting integrally closed on all sides except one side, and the open side being closed by a heavy metal cover plate 2 secured thereto by means of the screws 3, or in any other suitable manner. The casting 1, also the cover plate 2, has a thickness of not less than $\frac{3}{16}$'' so that the housing is of an extremely rugged character, permitting no bends, warping or other relative displacement between the sides and the cover plate.

One of the sides is provided with a threaded opening 4 which is adapted to receive the screw shank 5 of an input connector 6. This connector takes a general cylindrical shape and terminates at the end remote from the threaded portion 5 in a threaded collar 7, provided with a countersunk bore 8 and adapted to receive a nut 9. The purpose of the nut will be explained presently. The input connector is provided with an axial bore which receives a metal rod 10, extending into a larger stub portion 11 on the interior of the housing 1, and at the opposite end terminates in a metal terminal 12, provided with four quadrantal sections which give a compression effect to a leading-in conductor 14. The rod 10 is insulated from the cylinder 6 by suitable material, for example a plastic 15 of the polystyrene type. Material which is known on the market as "Amphenol" may be used for this purpose. At the opposite side of the housing 1 there is an opening which receives an insulating bushing 16, preferably of a plastic material, this bushing being adapted to receive a leading-out conductor 17 which carries an enlarged stub portion 18. The stub portions 11 and 18 preferably are arranged on opposite sides of the housing, and they should be proportioned to transfer sufficient energy to and from the resonant circuit without detuning it when the characteristics of their external associated circuits are changed. A suitable proportion and arrangement is exemplified in Figure 4.

The variable condenser is comprised essentially of a hollow cylindrical member 19, the interior of which is machined to dimension, terminating at the bottom (Figures 3 and 4) in a flanged base 20 which is secured in any suitable manner to the lower side of the housing. The upper edge of the cylinder 19 is given a curvilinear shape in order to provide the variations in changes of capacitance when the parts of the condenser are moved with respect to one another. The movable portion of the condenser is constituted of a plunger 21 which is slidably received by a cylinder 22, the latter being flanged at 23 and secured to the cover plate 2 by the screws 24. There is a longitudinal groove 25 provided at one side of the cylinder and a screw 26, carrying a locknut 27, is extended through the cylinder 22 into the groove. The purpose of the groove and the screw is to assure that the plunger 21 has only a reciprocatory movement within the cylinder and positively cannot rotate. The diameter of the plunger 21 is such that when extended it will move into the circular opening formed by the cylinder 19.

It is apparent that the plunger, also its groove 25, and the interior of the cylinder 22 are all machined to dimension and preferably polished. It is desirable to coat the plunger 21, the interior of the cylinder 19 and the two stubs 11, 18 with silver in order to provide a low resistance path for the high frequency energy, in which case the body of these elements may be formed of a higher resistance and cheaper metal, such as brass.

The plunger 21 is given its reciprocatory motion by means of a threaded rod 28, this rod extending practically the entire length of the plunger in order to assure stability of support. For this purpose the plunger 21 is provided with an internal bore which is threaded to receive the threads of the rod 28. The rod is shouldered at its upper end, as indicated at 29, the shouldered portion being journalled in the cover plate 2 and extending outside of the housing to serve as a shaft on which a large anti-back lash driving gear 30 and a pinion 31 are mounted. The plunger 21 is provided at its upper end with a countersunk bore 32 which receives the lower end of a compression spring 33, the latter bearing at its upper end against the under side of the cover plate 2. The purpose of the spring is to apply a constant pressure against the plunger 21 and thereby prevent any lost motion due to continued use.

Figure 6:
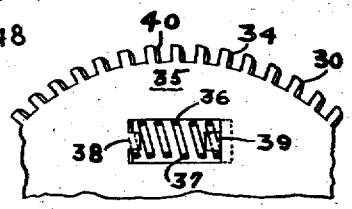
Figure 6 is a fragmentary plan view of the anti-back lash gear forming part of the actuating mechanism.
Figure 7:
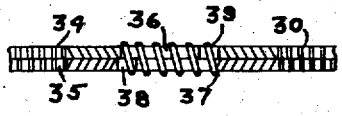
Figure 7 is a section taken through a portion of the back lash gear to show the mechanism by which the back lash is eliminated.

It is apparent that as the gear 30 is rotated, in a manner which will be described presently, the rod 28 will be likewise rotated, causing the plunger 21 to be moved either upwardly or downwardly depending on the direction in which the gear is rotated, and thus to increase or decrease the distance $d$ between the lower edge of the plunger and the nearest surface of the cylinder 19. The capacity of the wave meter is practically entirely concentrated in the space between the plunger 21 and the cylinder 19 so that variations of capacitance are obtained by moving the plunger with respect to the cylinder. The gear 30 is preferably constructed in such a manner as to eliminate all back lash, and the details of a preferred construction are shown in Figures 6 and 7.

The gear 30 is peripherally split into two sections 34, 35, each section being provided with a rectangular opening 36 which is adapted to receive a compression spring 37. One of the sections, for example 34, is provided with a tab 38 which extends into the opening 36, for example from left to right, as shown in Figure 6. The other section 35 is provided with a similar tab 39 positioned at the opposite side from the tab 38, and also extending into the opening 36. These tabs constitute oppositely positioned pins for locating the ends of the spring 37, the arrangement being such that the compressional effects of the spring serve to slide the gear section 34 with respect to the other section so that the teeth of the respective sections are slightly out of line with one another. It is apparent that any looseness of fit between the teeth 40 and teeth with which the gear meshes will readily be taken up by the relative movement between the gear sections 34, 35. The gear 30 is actuated by a pinion 41 which is journalled at the lower end in the cover plate 2, as indicated at 42, and is provided with a hub 43 at the upper end, the hub portion being extended as a small diameter shaft 44 which is provided with a hand-operated wheel 45. The shoulder between the shaft 44 and the hub 43 abuts a metal plate 46 which is separated from the cover plate 2 by means of the spacers 47. Thus by turning the hand wheel 45 it is possible to cause a reciprocatory motion of the plunger 21 through the pinion 41, anti-back lash gear 30, and the threaded rod 28.

Figure 4:
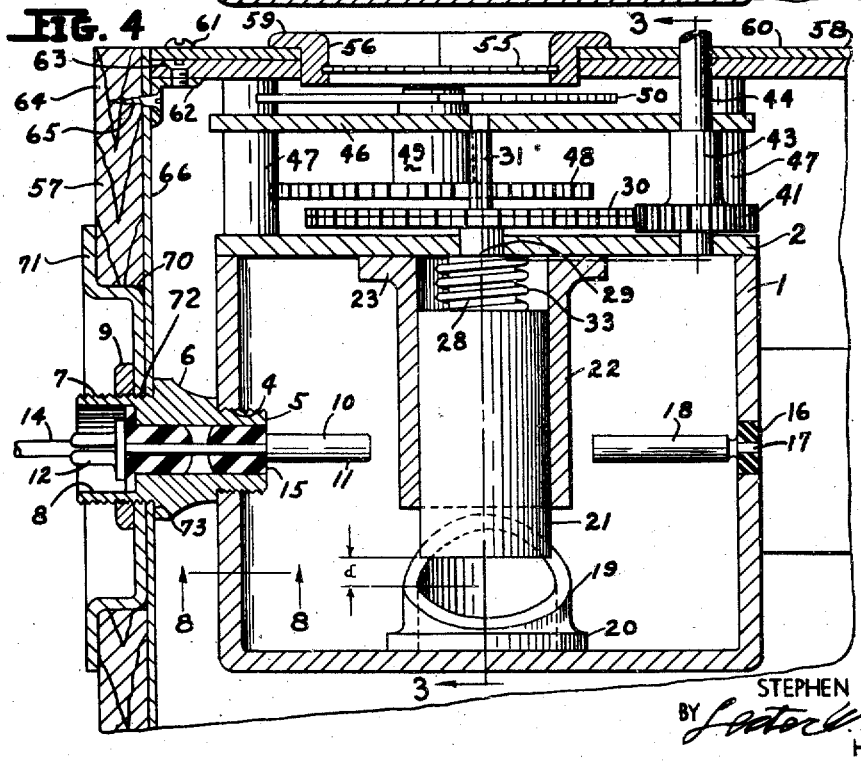
Figure 4 is a sectional view taken along the line 4—4 in Figure 2, and looking in the direction of the arrows.

The pinion 31 engages a gear 48 which is suitably journalled in the plate 46, and a shaft 49 is extended from the gear 48, this shaft carrying at its outer end a dial 50. The dial 50 is preferably divided into one hundred parts, of which each tenth division has been indicated on the drawings. The gear 30 is also adapted to mesh with a pinion 51 which is journalled at the hub portion 52 (Figure 3) in the plate 46, this hub portion being extended as a shaft 53 which carries a dial 54, preferably marked off in divisions, zero to 50. The dials 50, 54 are placed side-by-side in the same plane and quite close together so that the indications of the inner portions of the dials may be simultaneously read through a glass window 55, secured in a rubber bezel 56 (Figure 4).

Figure 5:
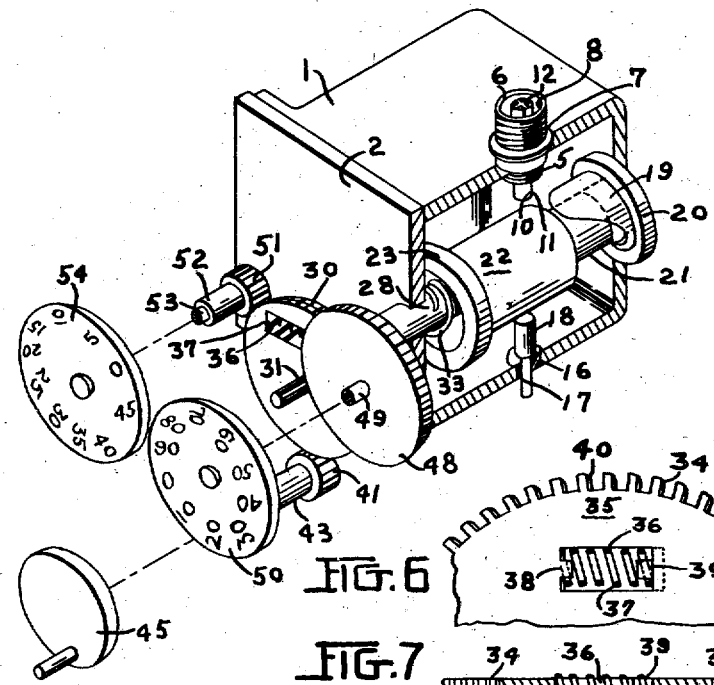
Figure 5 is a perspective view of the wave meter unit and associated gearing, the unit being broken away to show the internal parts.

A consideration of the gearing in Figure 5 will show that as the hand wheel 45 is rotated the pinion 41 will drive the gear 30 at a step-down speed, and assuming that the number of teeth on the pinions 41 and 51 is equal, the gear 30 will cause the pinion 51 to rotate at the same speed as the pinion 41 and the hand wheel 45. Thus the dial 54 will turn at the same rate as the hand wheel 45. However, the pinion 31, which has the same speed of rotation as the gear 30, drives the gear 48 at a relatively slow speed and the ratio between the number of teeth on the pinion and the gear is such that the dial 50, which is operated by the gear 48, is rotated at one-fiftieth the speed of the dial 54. Thus the gearing is such as to cause the number dial 50 to rotate fifty times slower than the counter dial 54 for a given type of device, and the construction of the gear 30 is such as to prevent substantially all back lash between this gear and either of its pinions 41, 51. When the hand wheel 45 is rotated the plunger 21 is reciprocated at a rate depending on the speed of rotation of the hand wheel and its direction of rotation, and the movements of the hand wheel are translated into exact reciprocatory movements at the plunger 21. The indications at both dials may be readily seen through the window 55.

All of the parts of the wave meter described hereinbefore, including the gearing and with the exception of the wheel 45, are contained in a wooden case 57, preferably of oak and varnished on its exterior surface. The wooden case is extended about the four sides and the bottom but with the top open to receive a panel 58 of a suitable insulating material such as hard rubber. The bezel 56 is preferably provided with a flange 59, which extends over and bears against the outer surface of the panel 58. This panel is held in place on a metal plate 60 by means of machine screws 61. The sides of the box which form the outer casing are held together by means of small angle iron pieces 62, one of which is shown at the upper left-hand corner in Figure 4 as being secured to the metal plate 60 by a screw 63. The other leg of the angle iron member is fastened to the wooden side 64 by a wood screw 65. There is a layer of copper 66 extending over the inner surfaces of the wooden sides, the corner portions of each copper plate being inserted between the angle iron 62 and the wooden side, thus being maintained rigidly in position. The purpose of the copper layer or sheet is electrically to shield the internal parts of the casing from any external fields, magnetic or electrostatic, so that the changes in electrical characteristics brought about by the movement of the plunger 21 are entirely free from deleterious effects.

Figure 8:
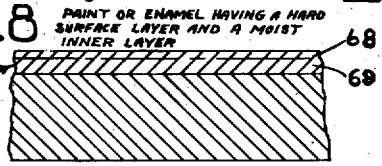
Figure 8 is a small section taken along the line 8—8 in Figure 4, and showing a slightly modified optional structure.

In addition to the use of a copper plate for shielding purposes, still another shield may be optionally employed about the aluminum casting within the wooden casing. As shown in Figure 8, the casting may be coated with paint or enamel of any suitable and well known type, which dries with a hard exterior surface but leaves a wet layer next to the aluminum casting. The purpose of the wet layer is to provide a conducting path of relatively high resistance around the aluminum casting between the input and output terminals, so that any leakage high frequency currents which tend to pass directly between the input terminal 6 and the output terminal 17 around the metal casting will be dissipated as heat in the resistance path formed by the interior layer of the paint or enamel. In Figure 8 the paint or enamel layer has been generally designated 67, of which the hard exterior layer is indicated at 68 and the wet interior layer at 69, these layers being separated by a dot and dash line.

The wooden side 64 nearest the input terminal 6 is provided with an opening 70 which receives a circular cup-shaped member 71, made preferably of brass or aluminum, the member being provided with a flange which bears against the outer surface of the wooden plate, as shown in Figure 4. The bottom of the cup-shaped member is provided with an opening 72 which is sufficiently large to snugly receive the threaded collar 7. The purpose of member 71 is to prevent energy passing around the outside of housing 1 to output electrode 18 and circuits associated therewith. The terminal 6 is provided with a shoulder 73, upon which the copper plate 66 and the bottom portion of the member 71 rest. The nut 9 presses the copper plate 66 and the member 71 tightly against the shoulder 73. The clamping effect exerted by the nut 9 closes all of the crevices or cracks at this point through which otherwise ultra-high frequency currents may leak. A handle 74 may be secured by the clips 75, which are screwed to one of the wooden sides of the casing for convenience in transporting the instrument.

Figure 9:
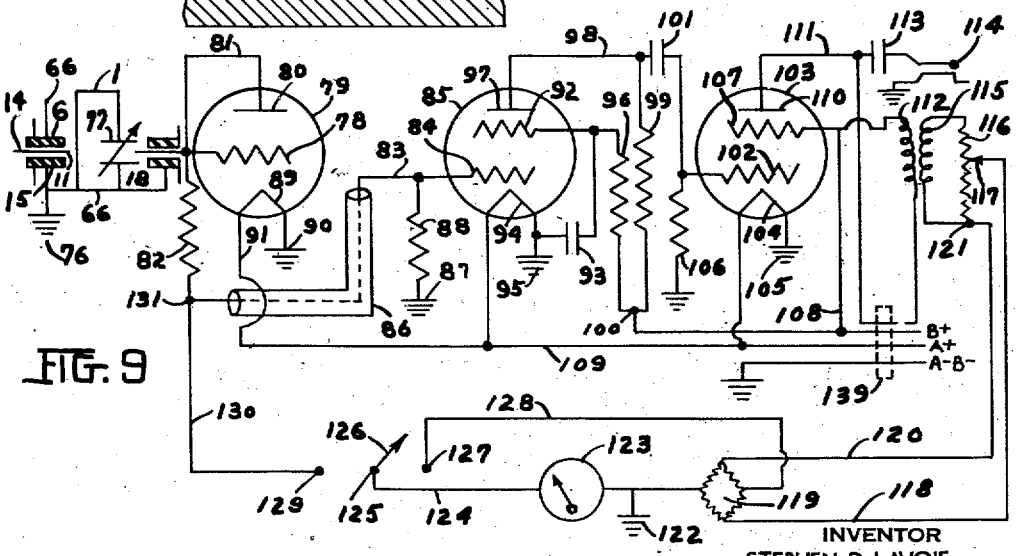
Figure 9 is a diagrammatic layout of the circuit.

The circuit for the improved instrument is shown in Figure 9, and for clearness the various elements of the instrument are indicated by single lines. Thus the copper layer 66 is shown as a vertical and horizontal line, grounded at 76, and the input terminal 6 which contains the input stub 11 is shown as passing through the copper layer. The aluminum casting 1 is diagrammatically indicated as a rectangle, and the capacitance or condenser effect existing between the lower end of the plunger 21 and the cylinder 19 is represented by a variable condenser 77. The output stub is designated 18, as in Figure 4, this stub being carried through the conductor 17 to the grid 78 of a diode detector tube 79. The plate 80 of the tube is connected to the grid through a conductor 81, and these two electrodes are connected through a resistor 82, by a conductor 83, to the control grid 84 of a high gain amplifier tube 85. The conductor 83 is preferably shielded throughout its length by a copper braid 86, and the conductor is grounded as at 87 through a resistor 88. The cathode of the tube 79 comprises a filament 89, one leg of which is grounded as indicated at 90, the other leg 91 being connected to a corresponding filament terminal of the cascade-connected amplifier tubes. The auxiliary grid 92 of the tube 85 is connected through a fixed condenser 93 to one leg of the filamentary cathode 94, this leg being grounded as indicated at 95. There is also a resistance connection indicated at 96 between the grid 92 and the B+ terminal of a battery, which preferably is of the dry cell type. The anode 97 of the tube 85 is connected through a conductor 98 and a resistor 99 to the B+ side of the battery, the lower terminals of the resistors 96 and 99 being connected together as indicated at 100.

The amplifier 85 is capacitively coupled through a condenser 101 to the control grid 102 of a second high gain amplifier 103. The filamentary cathode is indicated at 104, having one leg grounded at 105. The control grid 102 is also grounded through a resistor 106. The auxiliary grid 107 is connected through a conductor 108 to the B+ side of the high potential battery. It will be noted that one leg of the cathodes 89, 94 and 104 is connected through a common conductor 109 to the A+ side of a relatively high current dry cell battery. The plate 110 of the last amplifier tube 103 is connected through a conductor 111 to one end of a transformer primary 112, the other terminal of which is connected to the B+ side of the battery. A direct current blocking condenser 113 is inserted in an extension of the line 111, and a telephone jack 114 of any suitable and well known type is connected to the extension line, as indicated. The secondary 115 of the output transformer is shunted by an adjustable high resistance 116 provided with a movable tap 117. This tap is connected through a conductor 118 to one corner of an asymmetric resistance bridge circuit for example a rectifier bridge shown at 119, the opposite corner of which is connected through a conductor 120 to the lower terminal 121 of the transformer secondary. Copper oxide resistors having a forward resistance of 100 to 1000 ohms have been used satisfactorily in the bridge circuit. It will be understood, however, that the resistance values are selected in accordance with the characteristics of the associated components of the amplifying circuit and that the invention is not limited to specific values. One of the intermediate terminals of the bridge circuit is grounded at 122 and is also connected to a zero-to-200 micro-ampere scale ammeter 123. The other terminal of the meter is connected through a conductor 124 to an intermediate terminal on a double-throw switch 125, the blade of which is indicated at 126. The right-hand terminal 127 of the double-throw switch is connected through a conductor 128 to the remaining intermediate corner of the bridge 119, and the left-hand terminal 129 is connected through a conductor 130 to the junction 131 of the resistor 82 and the conductor 83.

*Operation of the instrument and circuit*

Assume that a source of modulated ultra-high frequency waves of unknown frequency is connected to the conductor 14. These high frequency currents will pass to the input stub 11 and will excite currents in the resonant circuit comprising the aluminum casting 1 and also in the plunger 21 and its associated cylinders 19 and 22, energy being stored alternately in the inductive and electrostatic fields of said circuit. The inductive reactive component of this circuit remains substantially constant, the control of the resonance of the circuit being vested almost entirely in the variable capacitative effect which is exercised between the lower surface of the movable plunger 21 and the upper or nearer surface of the cylinder 19. In passing through the resonance chamber comprising the aluminum casting, and the variable lumped capacity constituted by the plunger 21 and the cylinder 19, the high frequency currents excite corresponding currents in the output stub 18 and are applied to the combined grid and plate of the detector tube 79. At this point the oscillations are rectified and the modulation frequency components are successively amplified by the tubes 85, 103. The output of the last amplifier stage may be indicated at the telephone jack 114 but it is preferred to pass the output currents through the transformer to the bridge 119. When the switch blade 126 makes contact with the terminal 127 amplified currents are passed through the bridge to the microammeter 123. If the unknown signal is unmodulated, the blade 126 is turned to make contact with the terminal 129, and the ammeter 123 will thereby be connected directly to the detector 79. In this case the direct current components are not amplified but are received directly by the meter.

Figure 1:
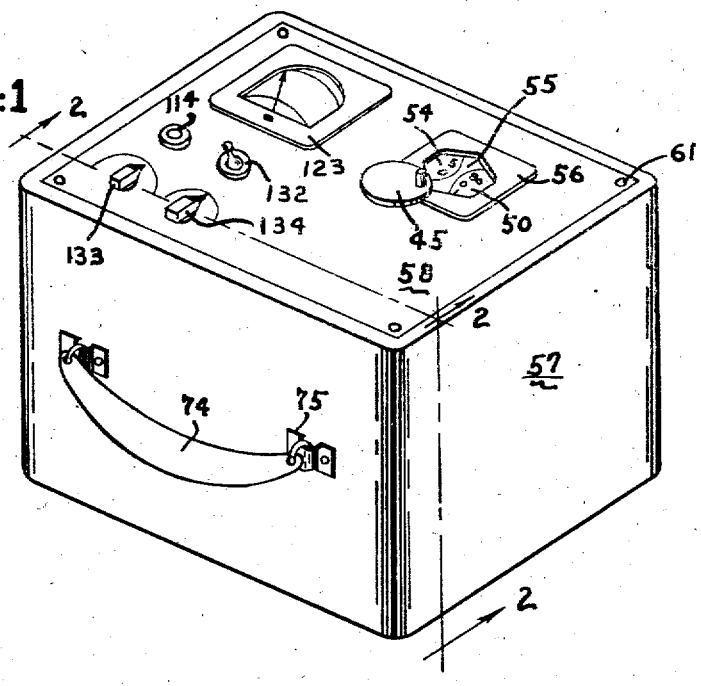
Figure 1 is a perspective view of the improved wave meter, which is illustrated as being contained in a box for carrying purposes.

For making the test for frequency, assume that the apparatus as a whole has been properly calibrated. The hand wheel 45 is rotated to cause the plunger 21 to recede from or approach the cylinder 19 until a maximum reading is observed at the microammeter 123. It is obvious that under these conditions the movement of the plunger 21 places the resonance chamber 1 in tune with the ultra-high frequency currents, and the exact vertical position of the plunger 21 by which this result is accomplished may be read as frequency or wave length by the two dials 50, 54. The dial 54 may be considered as giving a unit reading between the multiple indications of the dial 50. The reading of both dials may be observed through the single glass window 55 which is mounted on the face of the instrument, as shown in Figure 1. The meter 123 is mounted on the top cover of the casing, and in addition to the two indicators and the hand wheel there is a telephone jack 114 and an on-and-off switch 132 connected in the filament conductor 109, also a knob 133 for varying the resistance 116, and finally a knob 134 which is connected to the switch blade 126.

Figure 2:
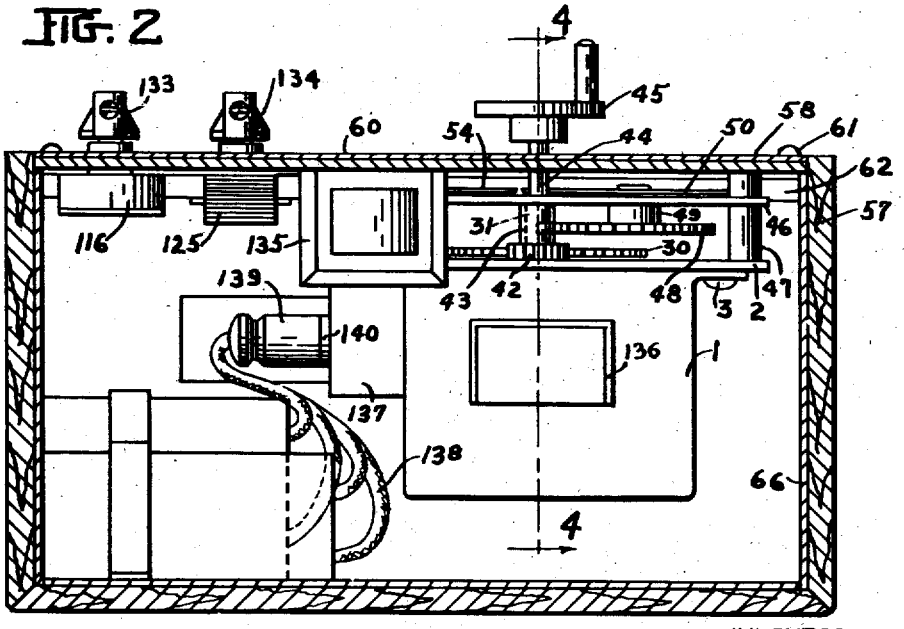
Figure 2 is a section taken along the line 2—2 in Figure 1, and looking in the direction of the arrows.

It is apparent that the face of the instrument contains only the minimum amount of apparatus, including the adjustment devices, so that the operation of the instrument as a whole is fairly simple. The casing 57 is sufficiently large to contain all of the necessary batteries, which are preferably of the dry cell type to increase their portability. The compactness of the instrument is clearly shown in Figure 2. The batteries are conveniently placed in one corner of the casing, and the transformer contained in a shielded case 135 is secured to and well insulated from the top cover 60 of the casing. The variable resistor 116 and the switch 125 are also conveniently mounted on the top cover, and the latter in addition supports the resonance chamber 1. It is preferrred to mount the detector 79 and the amplifiers 85, 103 on different sides of the resonance chamber. In Figure 2 the detector is shown as being contained in a metal casing 136 secured to the front side of the chamber 1, while the two amplifiers 85, 103 are contained in a metal casing 137 on a different side of the container, the two casings being interconnected by suitable wiring, not shown in Fig. 2. All of the battery leads, indicated at 138, are taken from their respective batteries through insulated cables to a removable adapter 139, which has prongs (not shown) making contact with sockets contained in a base member 140 secured to the amplifier casing. It is apparent that by moving the adapter 139 all battery connections are broken at the base 140.

From the foregoing it is evident that I have disclosed an improved wave meter which is adapted to measure either the frequency or wave length of high frequency oscillations which may be generated, for example, in a high frequency tube oscillator. The connections between the conductor 14 and the oscillator may be made in any suitable and well known manner, such as by means of a loop dipole, capacity or a direct connection. Energy from the stub 11 sets up oscillations in the resonator which reach a peak valve when the tuning adjustment exercised at the wheel 45 and carried through the plunger 21 and the cylinder 19 is in tune. The chamber 1 may be considered as a variable impedance and having a high impedance at resonance frequencies. The inductance of the circuit is at least approximately equivalent to a one turn toroidal coil. The capacitance is mainly concentrated between the elements 21 and 19. It is apparent that the free end of the plunger 21 and the cylinder 19 may be shaped to present to each other an increment of area variable in accordance with any predetermined function as the portions are moved relatively. For example, assuming that the lower end of the plunger 21 is flat, the cylinder 19 could be given a contour at the edge which would cause a straight-line function between the instantaneous position of the plunger 21 and either frequency or wave length of the currents to which the chamber has been attuned. Thus dials 50 and 54 may be calibrated in either frequency or wave length, depending on the shape of the edge surface at the cylinder 19.

It will be further noted that, due to the elimination of substantially all back lash by the anti-backlash gear formed of the sections 34, 35 and the compression effect exercised at the spring 33, a direct and positive relation is established between the instantaneous positions of the plunger 21 and the indications of that position shown by the dials 50, 54. Thus the improved instrument has a high degree of resettability so that the wave meter could be used for many years and still operate according to the calibration curve which had been determined by the manufacturer. This consideration is very important in connection with meters which measure ultra-high frequency such as in the range of 300 to 700 megacycles.

The concentric arrangement of the plunger 21 and the cylinder 19 is such that a movement of the plunger affects solely the capacitative element of the resonant circuit because the mutual inductace between the central cylindrical portion 22 and the outer casting 1 remains substantially constant regardless of the position of the plunger. Consequently, the movements of the plunger 21 introduce only a capacitative change in the characteristics of the resonant circuit, and this capacitance is lumped at one general point free from any deleterious magnetic or electrostatic effects and controllable solely by the operation of the hand wheel 45. As will be seen from Fig. 4, the electrodes 10 and 18 by which the input and output are capacitatively coupled with the resonant circuit comprising the housing 1, the plunger 21 and its associated cylinders 19 and 22 are located out of the primary field of the lumped capacity between the plunger 21 and cylinder 19 and hence provide a loose coupling with the circuit. The term "loose coupling" is herein used to mean a coupling that is below a critical value below which the meter will respond to only a single frequency for each position of the plunger 21. This loose coupling contributes to the sharpness of resonance of the circuit since it does not introduce into the circuit external impedance that would impair sharpness of resonance. It also avoids any material reactance of the resonant circuit of the meter on the input circuit and any material reactance of the output circuit on the resonant circuit in the housing 1. It is hence possible to change tubes in the output circuit without materially affecting the calibration of the meter. Moreover, the movement of the plunger 21 to vary the lumped capacitance between the plunger and the cylinder 19 does not materially change the coupling of the input or output electrodes, and hence does not introduce error.

While I have described the improved instrument as being adapted to measure the frequency or wave length of ultra-high frequency, oscillations, it will be understood that the instrument, if desired, may be designed to measure frequencies in the lower frequency ranges. Proper choice of the pitch of the threaded control shaft 28, size of the gears 30, 41, 48, 51, dimensions of the chamber 1 and cover plate 2 of the variable capacity elements 21, 19 and the shape of the curve of the cylindrical element 19 and the movement of the variable capacity plunger 21 may all be so designed that the range of frequencies over which the instrument will accurately respond may be considerably changed. However, the improved instrument has an important advantage over other instruments, particularly in the ultra-high frequency range, of responding to only one frequency as determined by the maximum reading at the meter 123, and positively will not respond to any harmonic or sub-multiple frequency, as is the case in instruments operable on the Lecher wire principle. The instrument operates on the principle of maximum current reading rather than null current reading, and thus introduces additional accuracy into the determinations.

If it is desired to cover a band of frequencies including 700 megacycles, housing 1 should be about 2½ inches wide as viewed in Fig. 4 and the other dimensions should be in proportion as illustrated. If it is desired to measure higher or lower frequencies, the dimensions of housing 1 and parts included therein should be varied substantially in proportion to the wave length of the frequency to be measured.

However, at frequencies below 700 megacycles it may be desirable to make stub electrodes 11 and 18 proportionately larger or to position them closer to cylinder 22 in order to increase the capacity therebetween. Conversely, at frequencies above 700 megacycles these electrodes may be smaller or they may be spaced further from cylinder 22. In general more capacity between the stub electrode and cylinder 22 will make the instrument more sensitive but its calibration will then be changed more when tube 79 is replaced by one having different interelectrode capacity, or when the capacity of conductor 14 is changed. Thus the exact size and position of the stub electrodes will depend upon the accuracy and sensitivity requirements. As used herein, the term "stub electrode" means the insulated terminal of a conductor arranged in more or less close juxtaposition to another conductor to form an electrical capacity therebetween. The term "electrical capacity" is used in a general sense in this paragraph since some energy may be transferred between the stub electrode and other circuit elements by radiation or by inductive coupling.

Having thus described my invention, what I claim as new and desire to secure by Letters Patent is:

1. A wavemeter for measuring ultra-high frequencies comprising an electrically resonant chamber including a closed metal container, a first metal portion secured to and projecting inwardly from one wall of said container, a second metal portion secured to and projecting inwardly from the wall approximately opposite said first metal portion to form a lumped electrical capacity therebetween, the free ends of said metal portions being oblique and shaped to present to each other an increment of area variable in accordance with a predetermined function as said portions are moved relatively, means for changing the resonance frequency of the resonant circuit thus formed by said container and said portions comprising means for moving the free ends of said portions relatively toward and away from one another, and coupling means positioned within said container for applying unknown frequencies to the resonant chamber and for withdrawing the oscillations from the resonant chamber for indicating resonance, said coupling means including insulated input and output electrodes projecting through the walls of said chamber on opposite sides of said metal portions, and in capacitative coupling relationship with at least one of said portions.

2. A wavemeter comprising an ultra-high frequency resonant circuit formed of a closed metal container forming a cavity, a first metal member projecting inwardly from one wall of said container, a second metal member projecting into said cavity from the approximately opposite wall of said container and concentric with said first member, a third metal member movably supported by one of said other members and concentric therewith to form with the other of said members a lumped electrical capacity, the extended ends of said two first-mentioned members being shaped to present to each other an increment of area variable in accordance with a predetermined function as they are moved relatively, means for changing the resonance frequency of the resonant circuit thus formed by said container and said members comprising means for moving the free ends of said members relatively toward and away from each other, means comprising an input stub electrode which passes through said metal container for applying oscillations of unknown frequency to said resonant circuit, means comprising an output stub electrode which passes through said metal container for withdrawing oscillations from said resonant circuit, and means for measuring the withdrawn current to indicate resonance.

3. A wavemeter comprising an ultra-high frequency resonant circuit formed of a closed metal container, a cup shaped metal member projecting inwardly from one wall of said container, a cylindrical member projecting inwardly from the approximately opposite wall of said container and concentric with said cup shaped member to form therewith a fixed electrical capacity, a metal plunger member movably supported by said cylindrical member for the greater portion of its length and forming with said cup shaped member a lumped electrical capacity, the extended ends of said two last mentioned members being shaped to present to each other an increment of area variable in accordance with a predetermined function as they are moved relatively, means for changing the resonance frequency of the resonant circuit thus formed by said container and said members comprising means for moving the plunger member relatively toward and away from the cup shaped member, means comprising an input stub electrode which passes through said metal container for applying oscillations of unknown frequency to said resonant circuit, means comprising an output stub which passes through said metal container for withdrawing oscillations from said resonant circuit, and means for measuring the withdrawn current to indicate resonance.

4. A wavemeter comprising an ultra-high frequency resonant circuit formed of a closed metal container, a tubular metal member secured to and projecting inwardly from one wall of said container, a cylindrical metal member secured to and projecting inwardly from the approximately opposite wall of said container and concentric with said tubular member to be received therein and to form therewith a lumped electrical capacity, the extended end of one of said members being shaped to terminate in a surface oblique to the common axis of said members, means for changing the resonance frequency of the resonant circuit thus formed by said container and said members comprising means for moving the free end of one of said members toward and away from the other of said members, and means positioned within said container for loosely coupling said resonant circuit to a source of unknown frequency and also to a resonance indicating apparatus, said coupling means including insulated input and output electrodes arranged on substantially opposite sides of said members, and outside the primary field of said lumped capacity.

5. A wavemeter of the coil and condenser type, comprising an ultra-high frequency resonant circuit formed of the following elements in combination: a closed metal container, a tubular metal member secured to and projecting inwardly from one wall of said container, a cylindrical metal member projecting from the approximate opposite wall concentrically with said tubular member and projecting into said member but out of physical contact therewith to form a lumped electrical capacity therebetween, means for changing the resonance frequency of the resonant circuit thus formed by said container and said concentric members comprising mechanical means relatively moving said members to move said cylindrical member into and out of said tubular member, frequency indicating means responsive to the relative position of said members, and means including stub electrodes which extend from opposite sides of the container approximately midway between the ends thereof and are spaced from said cylindrical metal member for applying oscillations of unknown frequency to the resonant circuit and for withdrawing oscillations from the resonant circuit to be measured by a resonance indicating apparatus.

6. A wavemeter of the coil and condenser type, comprising an ultra-high frequency resonant circuit formed of the following elements, in combination: a closed metal container, providing a cavity bounded on all sides by fixed wall surfaces, a tubular metal member secured to and projecting inwardly from one wall of said container, a cylindrical metal member projecting from the approximately opposite wall concentric with said tubular member and projecting into said member but out of physical contact therewith to form a lumped electrical capacity therebetween, a threaded shaft meshed into a threaded hole along the longitudinal axis of said cylindrical member, control means accessible from the exterior of said container for rotating said shaft to move said cylindrical member into and out of said tubular member to vary the resonance frequency of the resonator formed by said container and said concentric members, frequency indicating means responsive to rotation by said shaft, means including an input electrode for applying to said resonant circuit oscillations of unknown frequency, and means including an output electrode for withdrawing oscillations from said circuit and applying the withdrawn oscillations to a resonance indicating apparatus, said electrodes being arranged in juxtaposition with said members on opposite sides thereof, and outside the primary field of said lumped capacity.

7. In combination, an ultra-high frequency wavemeter of the coil and condenser type, comprising a metal housing substantially completely surrounding an adjustable condenser providing lumped capacity, said housing providing a cavity bounded on all sides by fixed wall surfaces, forming with said condenser a resonant circuit, means for indicating frequency, means for varying the capacity of said condenser and actuating said frequency indicating means, means including an input stub electrode for applying oscillations of unknown frequency to the resonant circuit, and means including an output stub electrode for withdrawing oscillations from the circuit and applying the same to resonance indicating apparatus, said electrodes being arranged substantially in line with one another in a plane longitudinally bisecting said housing and in capacitative coupling relationship with said adjustable condenser but outside the primary field thereof and being insulated from said condenser and from said housing, said housing serving as a substantially complete shield for the resonant circuit of which it is a part.

8. In an ultra-high frequency wavemeter of the coil and condenser type, the combination of a resonant circuit comprising a closed metal housing, providing a cavity bounded by fixed wall surfaces, a fixed condenser element provided on a wall of said housing, a movable condenser element inside said housing and cooperating with said fixed condenser element to provide a variable lumped capacity, said closed housing forming a substantially complete shield for said circuit and providing with the elements therein inductance of said circuit, coupling elements comprising conductors passing through and insulated from the wall of said housing and extending into said cavity for coupling said resonant circuit with an input circuit, the frequency of which is to be measured, and with an output circuit including means for indicating maximum energy output, said coupling elements being located outside the primary field of said condenser and providing a coefficient of coupling sufficiently low that a change of impedance in the input or output circuit does not materially change the frequency of response of said resonant circuit, means for moving said movable condenser element to vary said lumped capacity while maintaining said coupling coefficient substantially constant, and frequency indicating means responsive to movement of said movable element.

9. In an ultra-high frequency wavemeter of the coil and condenser type, the combination of a resonant circuit comprising a closed metal housing providing a cavity bounded on all sides by fixed wall surfaces, relatively movable condenser elements disposed inside said housing and electrically connected therewith, means for moving said condenser elements relative to one another, frequency indicating means responsive to the relative movement of said condenser elements, the condenser elements forming a variable lumped capacity and having the edges thereof relatively contoured to produce a substantially straight line function between the movement of the elements relative to one another and the reading indicated by the frequency indicating means, input and output conductors loosely coupled with said resonant circuit, and means connected with said output conductor to indicate maximum energy output.

10. In an ultra-high frequency wavemeter, the combination of a resonant circuit comprising a closed metal housing providing a cavity wholly bounded by fixed wall surfaces, a cup-shaped condenser element projecting inwardly from one wall of said housing, a sleeve member projecting inwardly from the opposite wall of said housing into proximity to said cup-shaped element, a plunger of lesser diameter than said sleeve and cup-shaped element movably supported by said sleeve for the greater portion of its length and movable into said cup-shaped element to form a variable capacity, means for moving said plunger, frequency indicating means responsive to the movement of said plunger, the extended ends of the plunger and cup-shaped element being relatively contoured to produce a predetermined function between the movement of said plunger and the reading of said frequency indicating means, coupling elements passing through the wall of said cavity on diametrically opposite sides of said sleeve for coupling said resonant circuit with an input circuit, the frequency of which is to be measured, and with an output circuit including means for indicating maximum energy output, and insulating means between said coupling elements and said housing, said coupling elements being located outside the primary field of said condenser.

STEPHEN D. LAVOIE.

REFERENCES CITED

The following references are of record in the file of this patent:

UNITED STATES PATENTS

| Number | Name | Date |
|---|---|---|
| 2,137,435 | Yolles | Nov. 22, 1938 |
| 2,251,085 | Unk | July 29, 1941 |
| 2,281,550 | Barrow | May 5, 1942 |
| 2,106,713 | Bowen | Feb. 1, 1938 |
| 2,245,138 | Zottu | June 10, 1941 |
| 2,086,615 | Grundmann | July 13, 1937 |
| 2,095,990 | Lindenblad | Oct. 19, 1937 |
| 2,218,923 | Newhouse | Oct. 22, 1940 |
| 2,235,521 | Higgins | Mar. 18, 1941 |
| 2,323,201 | Carter | June 29, 1943 |

OTHER REFERENCES

"Natural Oscillations in Electrical Cavities," by Barrow and Miehers; Proc. IRE, April 1940, pp. 184–191. Copy in Division 51.

"Cavity Resonators," by Terman, Handbook of Radio Engineers, pp. 264–273. McGraw-Hill Co. 1943. Copy in Division 51.